(12) United States Patent
Benario et al.

(10) Patent No.: US 10,169,902 B2
(45) Date of Patent: *Jan. 1, 2019

(54) APPLICATION LAUNCHING ANIMATION FOR CONNECTING A TILE AND SURFACE

(71) Applicant: Microsoft Technology Licensing, LLC, Redmond, WA (US)

(72) Inventors: Steven P. Benario, Seattle, WA (US); Maverick Velasco, Sammamish, WA (US); Bonny Lau, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/858,857

(22) Filed: Dec. 29, 2017

(65) Prior Publication Data

US 2018/0122121 A1 May 3, 2018

Related U.S. Application Data

(63) Continuation of application No. 13/344,798, filed on Jan. 6, 2012, now Pat. No. 9,870,635.

(51) Int. Cl.
*G06T 13/00* (2011.01)
*G06T 13/80* (2011.01)
(Continued)

(52) U.S. Cl.
CPC .............. *G06T 13/00* (2013.01); *G06T 13/20* (2013.01); *G06T 13/80* (2013.01); *G09G 5/006* (2013.01);
(Continued)

(58) Field of Classification Search
CPC ......... G06T 13/00; G06T 13/20; G06T 13/80; G09G 5/0006; G09G 2370/12;
(Continued)

(56) References Cited

U.S. PATENT DOCUMENTS 5,914,717 A 6/1999 Kleewein et al.
6,049,336 A 4/2000 Liu et al.
(Continued)

OTHER PUBLICATIONS

"Animations and Transitions", Retrieved at: https://msdn.microsoft.com/en-us/library/windows/desktop/dn742481(v=vs.85).aspx, Nov. 18, 2011, 22 Pages.
(Continued)

*Primary Examiner* — Jwalant Amin
(74) *Attorney, Agent, or Firm* — Alleman Hall Creasman & Tuttle LLP

(57) ABSTRACT

In one embodiment, an application presentation system may allow a user to visually track a change between states of an application by having a marker visual that becomes an application visual. The application presentation system may present a predecessor visual 402 representing a predecessor operational state of an application. The application presentation system may change the application into a successor operational state with a successor visual 404. The application presentation system may present a transition animation tracking a transition between the predecessor operational state and the successor operational state.

20 Claims, 8 Drawing Sheets

(51) Int. Cl.
  *H04N 5/262* (2006.01)
  *G06T 13/20* (2011.01)
  *G09G 5/00* (2006.01)
  *H04W 4/50* (2018.01)
  *H04M 1/725* (2006.01)
  *H04N 21/4143* (2011.01)
  *H04N 21/443* (2011.01)

(52) U.S. Cl.
  CPC .............. *H04N 5/262* (2013.01); *H04W 4/50* (2018.02); *G09G 2370/12* (2013.01); *H04M 1/72544* (2013.01); *H04N 21/4143* (2013.01); *H04N 21/4438* (2013.01)

(58) Field of Classification Search
  CPC .. G09G 5/006; H04W 4/001; H04M 1/72544; H04N 5/262; H04N 21/4143; H04N 1/4438
  See application file for complete search history.

(56) References Cited

U.S. PATENT DOCUMENTS

| | | | |
|---|---|---|---|
| 6,484,189 B1 | 11/2002 | Gerlach, Jr. et al. | |
| 2006/0062168 A1 | 3/2006 | Kang et al. | |
| 2007/0016873 A1 | 1/2007 | Lindsay | |
| 2007/0153006 A1 | 7/2007 | Robbins et al. | |
| 2009/0007017 A1* | 1/2009 | Anzures | G06F 3/04883 715/835 |
| 2009/0150819 A1* | 6/2009 | Cheong | G06F 3/0416 715/771 |
| 2009/0315897 A1 | 12/2009 | Kwiatkowski et al. | |
| 2010/0162153 A1 | 6/2010 | Lau | |
| 2011/0225543 A1* | 9/2011 | Arnold | G06F 3/0488 715/799 |
| 2012/0262462 A1 | 10/2012 | Montan et al. | |
| 2013/0057555 A1* | 3/2013 | Huang | G06T 13/80 345/473 |
| 2013/0111395 A1* | 5/2013 | Ying | G06F 3/0483 715/783 |

OTHER PUBLICATIONS

"Final Office Action issued in U.S. Appl. No. 13/344,798", dated Jan. 21, 2015, 10 Pages.
"Final Office Action issued in U.S. Appl. No. 13/344,798", dated Dec. 4, 2015, 13 Pages.
"Final Office Action issued in U.S. Appl. No. 13/344,798", dated Jan. 31, 2017, 12 Pages.
"Non Final Office Action issued in U.S. Appl. No. 13/344,798", dated May 22, 2015, 12 Pages.
"Non Final Office Action issued in U.S. Appl. No. 13/344,798", dated Jun. 17, 2016, 14 Pages.
"Notice of Allowance Issued in U.S. Appl. No. 13/344,798", dated Sep. 8, 2017, 9 Pages.
"Non Final Office Action Issued in U.S. Appl. No. 13/344,798", dated Aug. 1, 2014, 13 Pages.
Joung, et al., "Icon-Based Animation from the Object and Dynamic Models Based on OMT", In the Proceedings of Third Asia Pacific on Computer Human Interaction, Jul. 7, 1998, pp. 465-471.

* cited by examiner

*200*

*250*

*300*

*350*

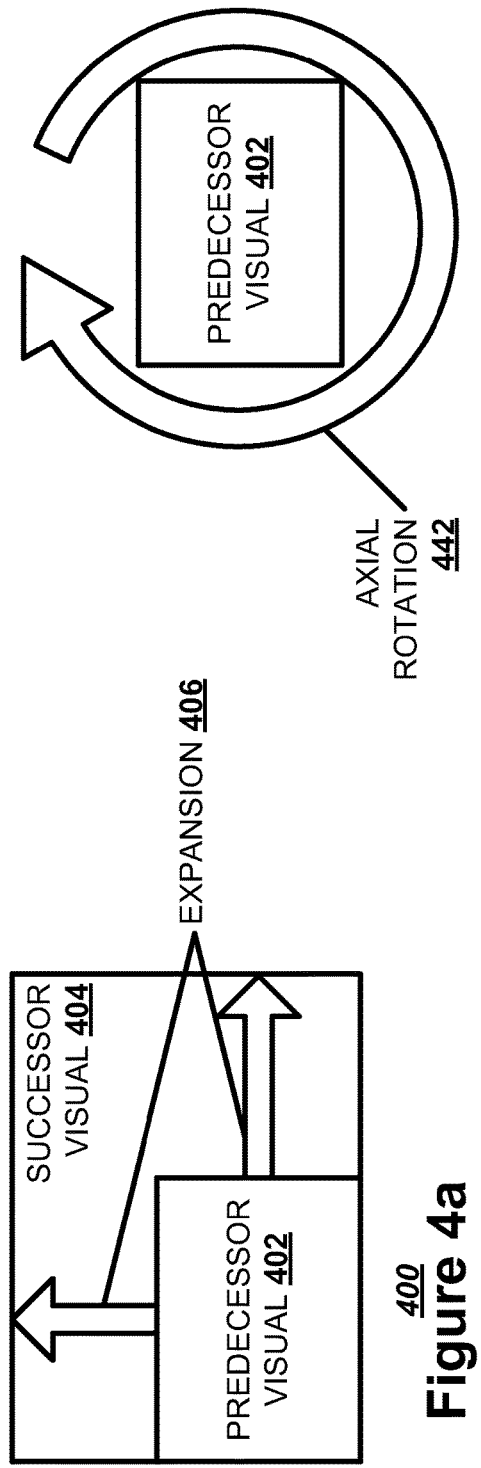
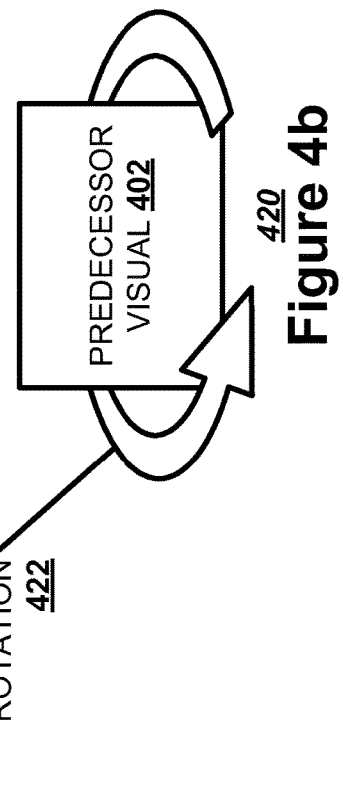

*800*

APPLICATION LAUNCHING ANIMATION FOR CONNECTING A TILE AND SURFACE

CROSS REFERENCE TO RELATED APPLICATIONS

This application is a continuation of U.S. patent application Ser. No. 13/344,798, filed Jan. 6, 2012, the entire contents of which is hereby incorporated herein by reference for all purposes.

BACKGROUND

A computer device may represent a set of applications to a user by presenting a set of icons as part of a desktop, or a home screen of an operating system. An application is a computer software or firmware program that performs a task or set of tasks. An icon is a static bitmap representing the application. A user may open an application by selecting the icon, either by clicking on the icon with a mouse or touching the icon on a touch screen. Opening an application moves the application to the foreground of the display, often represented by a graphical user interface. The computer device may display the desktop with one or more icons or one or more graphical user interfaces of one or more applications.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

Embodiments discussed below relate to allowing a user to visually track a change between states of an application by having a marker visual that becomes an application visual. The application presentation system may present a predecessor visual representing a predecessor operational state of an application. The application presentation system may change the application into a successor operational state with a successor visual. The application presentation system may present a transition animation tracking a transition between the predecessor operational state and the successor operational state.

DRAWINGS

In order to describe the manner in which the above-recited and other advantages and features can be obtained, a more particular description is set forth and will be rendered by reference to specific embodiments thereof which are illustrated in the appended drawings. Understanding that these drawings depict only typical embodiments and are not therefore to be considered to be limiting of its scope, implementations will be described and explained with additional specificity and detail through the use of the accompanying drawings.

FIG. 1 illustrates, in a block diagram, one embodiment of a computing device.

FIGS. 2a-b illustrate, in block diagrams, embodiments of display screens presenting marker visuals.

FIGS. 3a-b illustrate, in block diagrams, embodiments of display screens presenting application visuals.

FIGS. 4a-c illustrate, in block diagrams, embodiments of transition animations.

DETAILED DESCRIPTION

Figure 1:
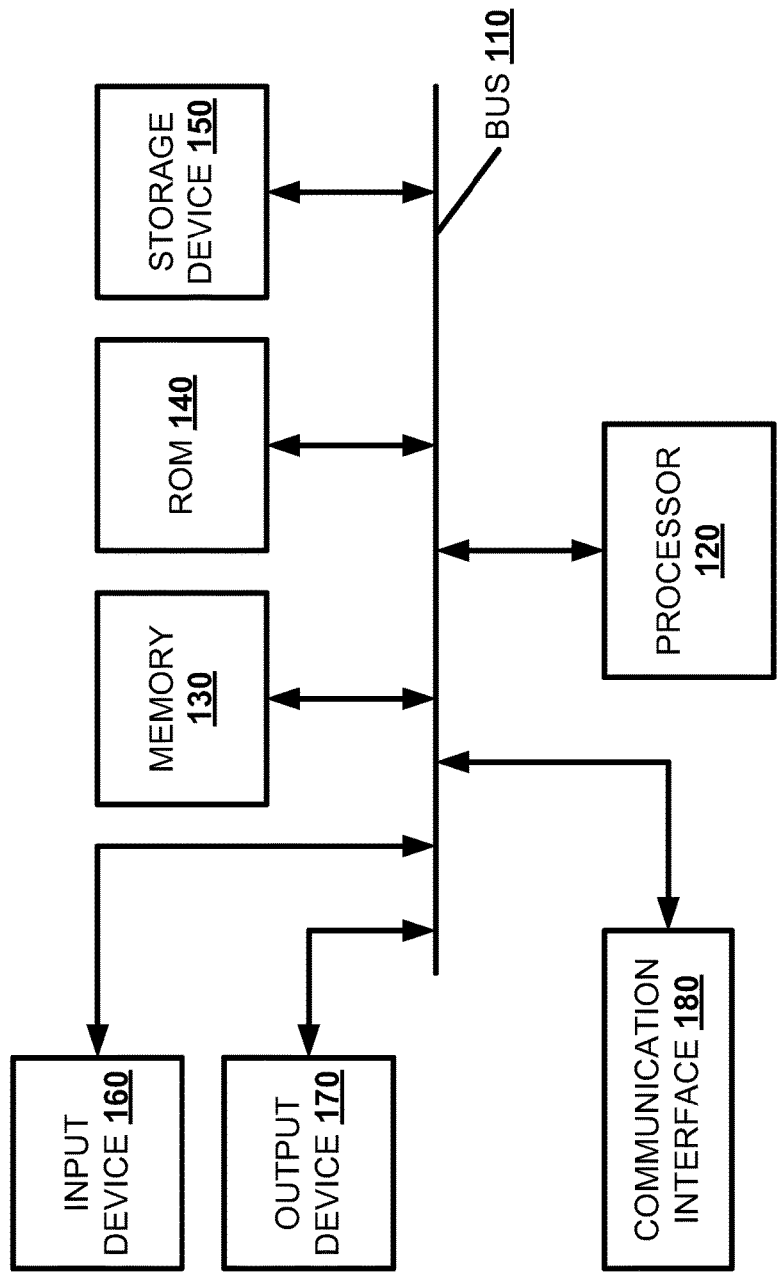

Embodiments are discussed in detail below. While specific implementations are discussed, it should be understood that this is done for illustration purposes only. A person skilled in the relevant art will recognize that other components and configurations may be used without parting from the spirit and scope of the subject matter of this disclosure. The implementations may be a machine-implemented method, a tangible machine-readable medium having a set of instructions detailing a method stored thereon for at least one processor, or an application presentation system for a computing device.

An application presentation system may present a visual to represent an application. The application may have a different visual for each state of the application, such as an application visual to represent the application during an interactive state and a marker visual to act as a placeholder when not fully interactive. A marker visual does not fully interact with a user, although certain minimal processes may be executed invisibly or may provide a limited amount of data. An application in an interactive state interacts with a user, receiving user input beyond opening the application. The application presentation system may track the transition between states using a transition animation. The transition animation may show the transformation of the marker visual to the application visual.

The transition animation may directly connect the launch of the application and the user interface of the application. The visual that the user activates to launch the application may be referred to as the marker visual. Once activated, the marker visual may begin transitioning towards the application visual, which is the visual representing the application once the launch process has been completed. The transition animation may replace a generic animation, and may or may not include the marker visual as a part of that animation. The transition animation incorporates the marker visual and the application visual, showing the marker visual becoming the application visual or the application visual becoming the marker visual. The transition animation may connect the marker visual and the application visual so that users are able to draw a clear relationship between the marker visual and the application visual, as well as track the transition process. The transition animation may show the marker visual becoming the application visual, with the transition process being closely tracked by the transition animation. For example, the speed of the transition animation may be based on the progress of the transition, with aspects of the application becoming more visible as those aspects become active.

Thus, in one embodiment, an application presentation system may allow a user to visually track a change between states of an application by having a marker visual that becomes an application visual. The application presentation system may present a predecessor visual representing a predecessor operational state of an application. The application presentation system may change the application into a successor operational state with a successor visual. The application presentation system may present a transition animation tracking a transition between the predecessor operational state and the successor operational state.

FIG. 1 illustrates a block diagram of an exemplary computing device 100 which may display applications. The computing device 100 may combine one or more of hardware, software, firmware, and system-on-a-chip technology to implement an application presentation system. The computing device 100 may include a bus 110, a processor 120, a memory 130, a read only memory (ROM) 140, a storage device 150, an input device 160, an output device 170, and a communication interface 180. The bus 110 may permit communication among the components of the computing device 100.

The processor 120 may include at least one conventional processor or microprocessor that interprets and executes a set of instructions. The memory 130 may be a random access memory (RAM) or another type of dynamic storage device that stores information and instructions for execution by the processor 120. The memory 130 may also store temporary variables or other intermediate information used during execution of instructions by the processor 120. The ROM 140 may include a conventional ROM device or another type of static storage device that stores static information and instructions for the processor 120. The storage device 150 may include any type of tangible machine-readable medium, such as, for example, magnetic or optical recording media and its corresponding drive. A tangible machine-readable medium is a physical medium storing machine-readable code or instructions, as opposed to a transitory medium or signal. The storage device 150 may store a set of instructions detailing a method that when executed by one or more processors cause the one or more processors to perform the method. The storage device 150 may also be a database or a database interface for storing applications and application representations.

The input device 160 may include one or more conventional mechanisms that permit a user to input information to the computing device 100, such as a keyboard, a mouse, a touch screen, a voice recognition device, a microphone, a headset, etc. The output device 170 may include one or more conventional mechanisms that output information to the user, including a display, a printer, one or more speakers, a headset, or a medium, such as a memory, or a magnetic or optical disk and a corresponding disk drive. The communication interface 180 may include any transceiver-like mechanism that enables computing device 100 to communicate with other devices or networks. The communication interface 180 may include a network interface or a transceiver interface. The communication interface 180 may be a wireless, wired, or optical interface.

The computing device 100 may perform such functions in response to processor 120 executing sequences of instructions contained in a computer-readable medium, such as, for example, the memory 130, a magnetic disk, or an optical disk. Such instructions may be read into the memory 130 from another computer-readable medium, such as the storage device 150, or from a separate device via the communication interface 180.

The computer device 100 may display a set of marker visuals representing an application while the application is in a placeholder state, or a not fully interactive state. A user may select the marker visual to open the application, changing the application to an interactive state. An application in a placeholder state may receive a user input acting as an open command that specifies the parameters of the interactive state. The marker visual may take the form of at least one of an icon or a tile.

Figure 2A:
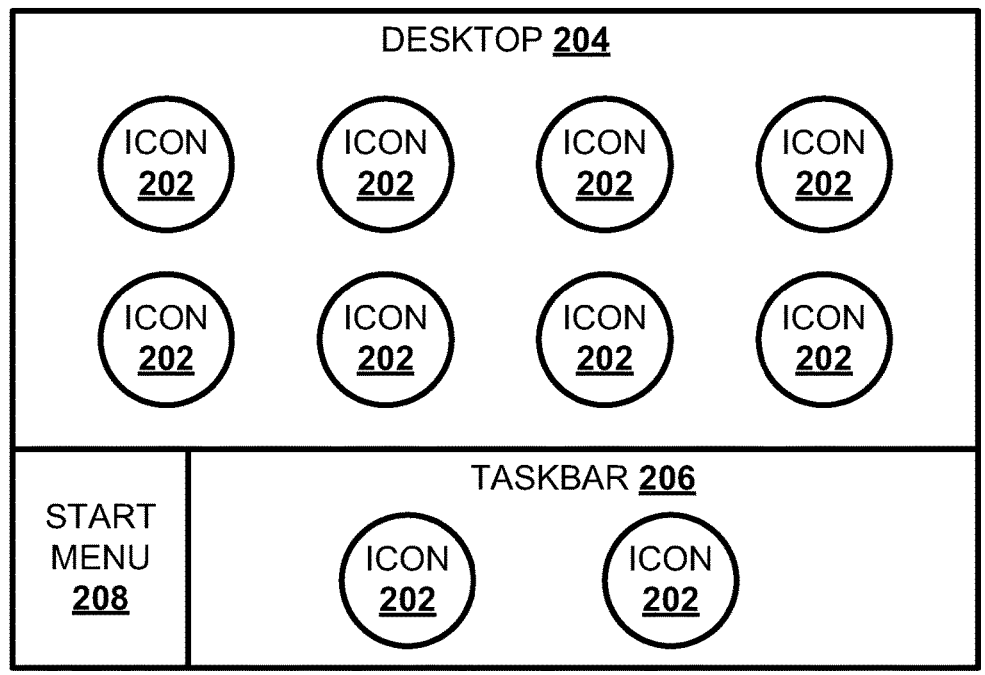

FIG. 2a illustrates, in a block diagram, one embodiments of a display screen 200 displaying an icon 202. The display screen 200 may have a desktop 204 for displaying one or more icons 202. The icon 202 is a static bitmap representing a data file or an application. An icon 202 representing a data file may also represent an application for presenting the data in a data file. By selecting an icon 202 representing a data file, the user may open an application to present the data file. For example, selecting a video file may open a media player application.

The display screen may also have a taskbar 206 and a start menu 208 on a specified location on the display screen 200. The taskbar 206 may have an icon 202 representing an application in an interactive state. Additionally, a taskbar may have an icon 202 representing a frequently used application even if that application is in a placeholder state.

Figure 2B:
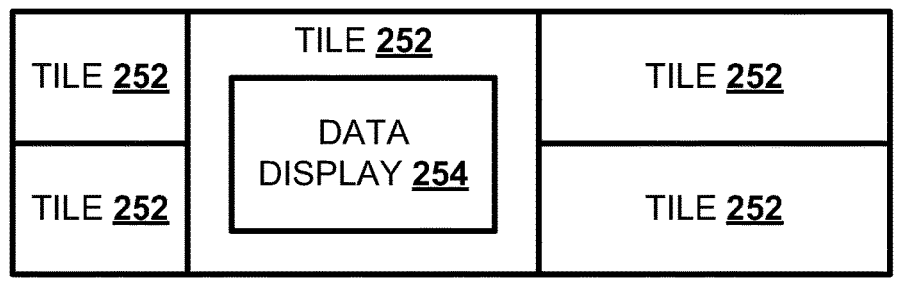

FIG. 2b illustrates, in a block diagram, one embodiment of a display screen 250 displaying a tile 252. A tile 252 is a marker visual that may incorporate a data display 254 presenting a limited amount of data. For example, a tile 252 for a weather forecast application may incorporate a data display 254 presenting a weather forecast for a location set while the application was in an interactive state. The tiles 252 may be of any size and shape.

Once a marker visual has been selected by a user, the application may transition to a more interactive state. The marker visual may be changed to an application visual representing the application in an interactive state, such as a graphical user interface.

Figure 3A:

FIG. 3a illustrates, in a block diagram, one embodiment of a display screen 300 displaying a full screen application visual. The display screen 300 may support an application visual, such as a graphical user interface frame, having a full screen format 302. The full screen format may cover the active area of the display screen 300.

Figure 3B:
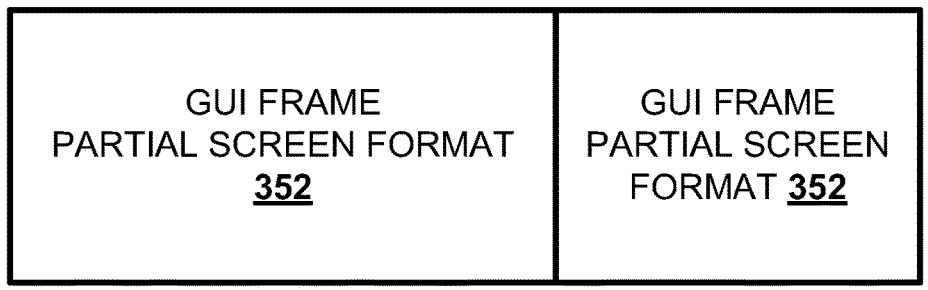

FIG. 3b illustrates, in a block diagram, an alternate embodiment of a display screen 350 displaying a partial screen application visual. The display screen 300 may support an application visual, such as a graphical user interface frame, having a partial screen format 352. The partial screen format may cover part of the active area of the display screen 350. Multiple graphical user interfaces with a partial screen format 352 may interlock across the display screen 350. The user input may specify whether the application is being opened in a full screen format 302 or a partial screen format 352.

The application presentation system may illustrate the transition between states using a transition animation. The transition animation tracks the transition between a predecessor operational state of the application and a successor operational state of the application, showing the predecessor visual becoming the successor visual. The predecessor operational state may be an interactive state or a placeholder state, just as the successor operational state may be an interactive state or a placeholder state. The application presentation system may track the transition using one or more transition animations. The progress of the transition animation may represent the progress of the transition, with the speed of the animation matching speed of the transition.

For example, FIG. 4a illustrates, in a block diagram, one embodiment of an expanding transition animation 400. A predecessor visual 402 may transition into a successor visual 404. The predecessor visual 402 may represent the predecessor operational state of the application, and the successor visual 404 may represent the successor operational state of the application. The application presentation system may execute an expansion 406 on the predecessor visual 402 to create the successor visual 404. The expansion 406 may be proportional in each direction or have varying proportions. The application presentation system may add pixel detail to the predecessor visual 402 as the predecessor visual 402 expands into the successor visual 404. The opposite of an expansion 406 is a contraction.

FIG. 4b illustrates, in a block diagram, one embodiment of an orthogonal rotational transition animation 420. The application presentation system may execute an orthogonal rotation 422 on the predecessor visual 402 to create the successor visual 404. An orthogonal rotation 422 is perpendicular to the plane of the predecessor visual 402. The successor visual 404 may be on reverse side of the predecessor visual 402.

FIG. 4c illustrates, in a block diagram, one embodiment of an axial rotational transition animation 440. The application presentation system may execute an axial rotation 442 on the predecessor visual 402 to create the successor visual 404. An axial rotation 442 is planar to the predecessor visual 402. The predecessor visual 402 may be an inverted successor visual 404.

Figure 5:
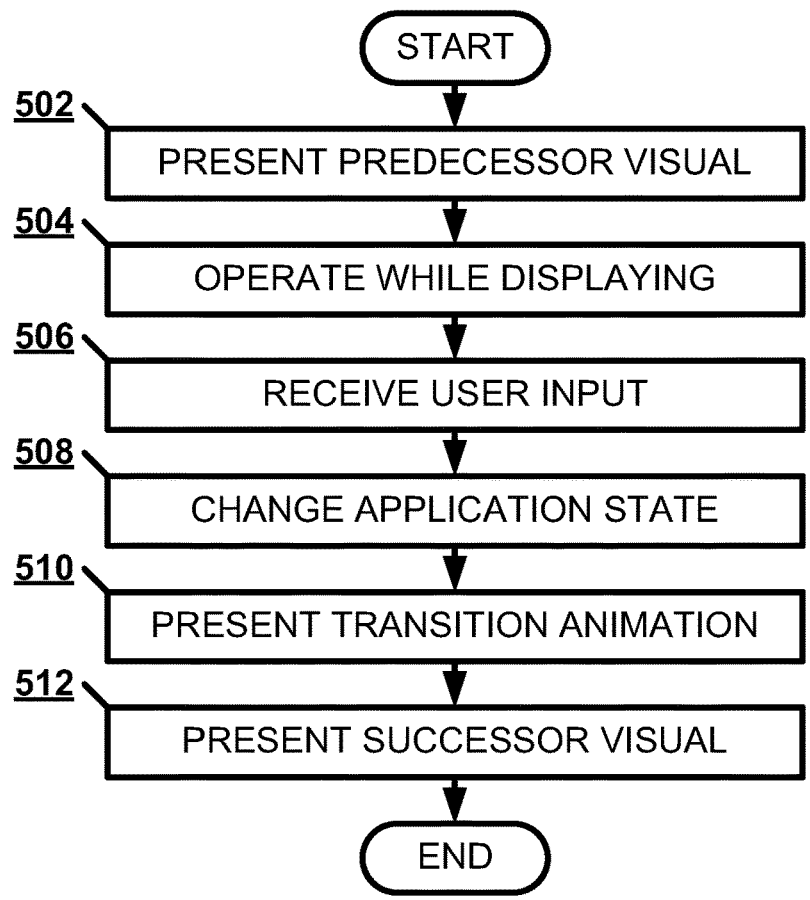
FIG. 5 illustrates, in a flowchart, one embodiment of a method for changing an application in a predecessor operational state.

FIG. 5 illustrates, in a flowchart, one embodiment of a method 500 for changing an application in a predecessor operational state. The application presentation system may present a predecessor visual 402 representing a predecessor operational state of an application (Block 502). The application presentation system may present at least one of an icon 202 and a tile 252 as the predecessor visual. The application presentation system may operate the application while displaying the predecessor visual 402 (Block 504). For example, the application presentation system may be running background operations while displaying a marker visual as the predecessor visual. The application presentation system may receive a user input selecting the application (Block 506). The application presentation system may change the application into a successor operational state with a successor visual 404 (Block 508). The application presentation system may present a transition animation tracking a transition between the predecessor operational state and the successor operational state (Block 510). The application presentation system may present the successor visual 404 representing the successor operational state (Block 512).

Figure 6:
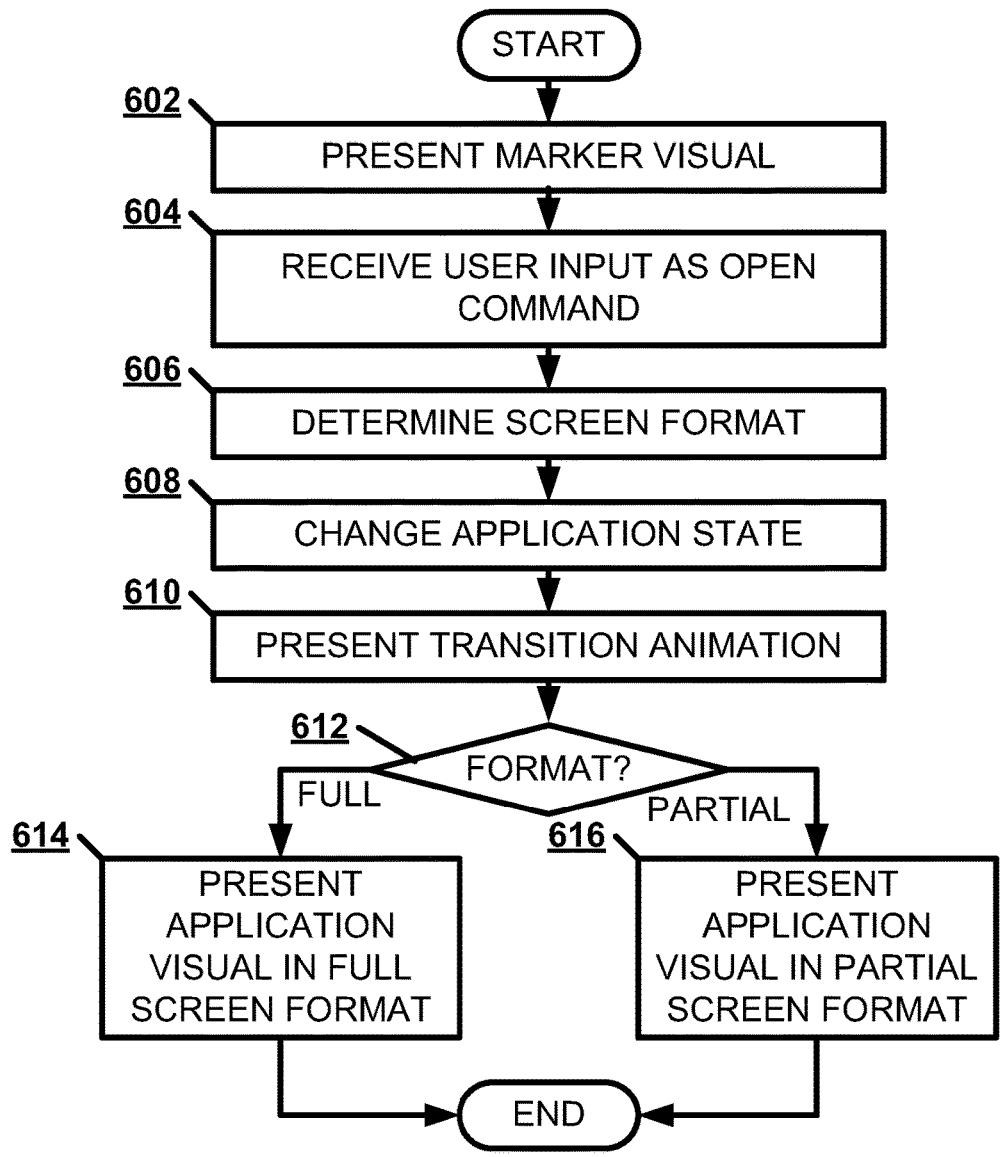
FIG. 6 illustrates, in a flowchart, one embodiment of a method for opening an application in a placeholder state.

The predecessor visual 402 may be a marker visual and the successor visual 404 may be an application visual. FIG. 6 illustrates, in a flowchart, one embodiment of a method 600 for opening an application in a placeholder state. The application presentation system may present a marker visual representing a placeholder state of an application (Block 602). The application presentation system may present at least one of an icon 202 and a tile 252 as the marker visual. The application presentation system may receive a user input selecting the application indicating an open command (Block 604). The application presentation system may determine between a full screen format and a partial screen format for an application visual based on the user input (Block 606). The application presentation system may change the application into an interactive state with the application visual (Block 608). The application presentation system may present an opening transition animation tracking an opening transition between the placeholder state and the interactive state (Block 610). An opening transition is a transition from a placeholder state to an interactive state. The opening transition animation may be at least one of an axial rotation, an orthogonal rotation, or an expansion. If the user has indicated a full screen format for the application visual (Block 612), the application presentation system may present the application visual in a full screen format (Block 614). If the user has indicated a partial screen format for the application visual (Block 612), the application presentation system may present the application visual in a partial screen format (Block 616).

Figure 7:
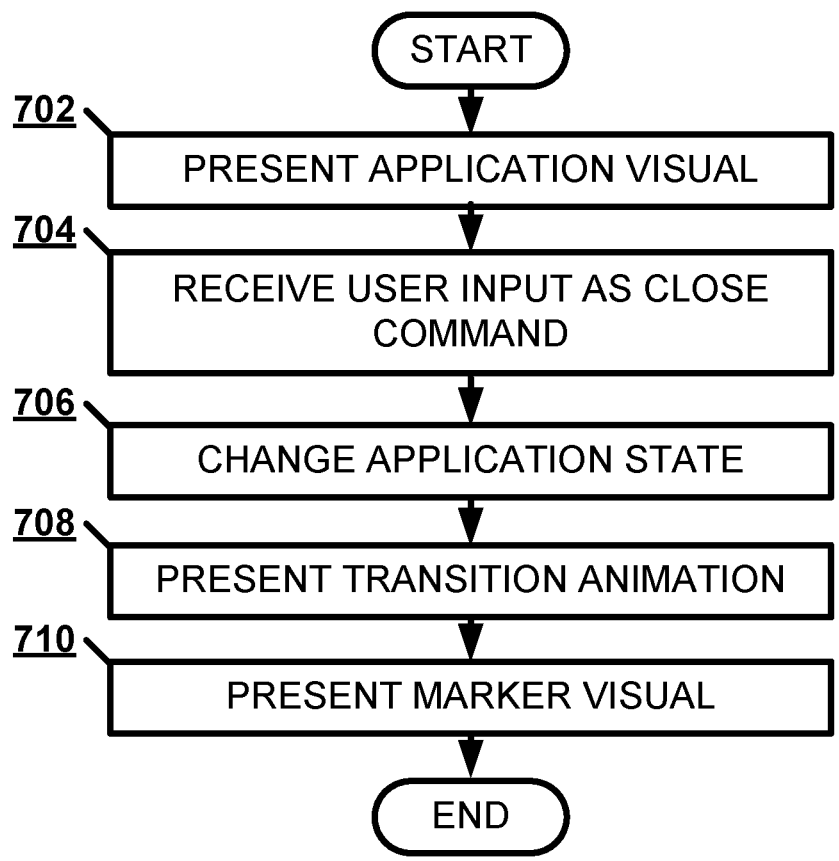
FIG. 7 illustrates, in a flowchart, one embodiment of a method for closing an application in an interactive state.

Alternately, the predecessor visual 402 may be an application visual and the successor visual 404 may be a marker visual. FIG. 7 illustrates, in a flowchart, one embodiment of a method 700 for closing an application in an interactive state. The application presentation system may present an application visual representing an interactive state of an application (Block 702). The application presentation system may receive a user input selecting the application indicating a close command (Block 704). The application presentation system may change the application into a placeholder state with a marker visual (Block 706). The application presentation system may present a closing transition animation tracking a closing transition between the interactive state and the placeholder state (Block 708). A closing transition is a transition from an interactive state to a placeholder state. The closing transition animation may be at least one of an axial rotation, an orthogonal rotation, or a contraction. The application presentation system may present the marker visual (Block 710).

Figure 8:
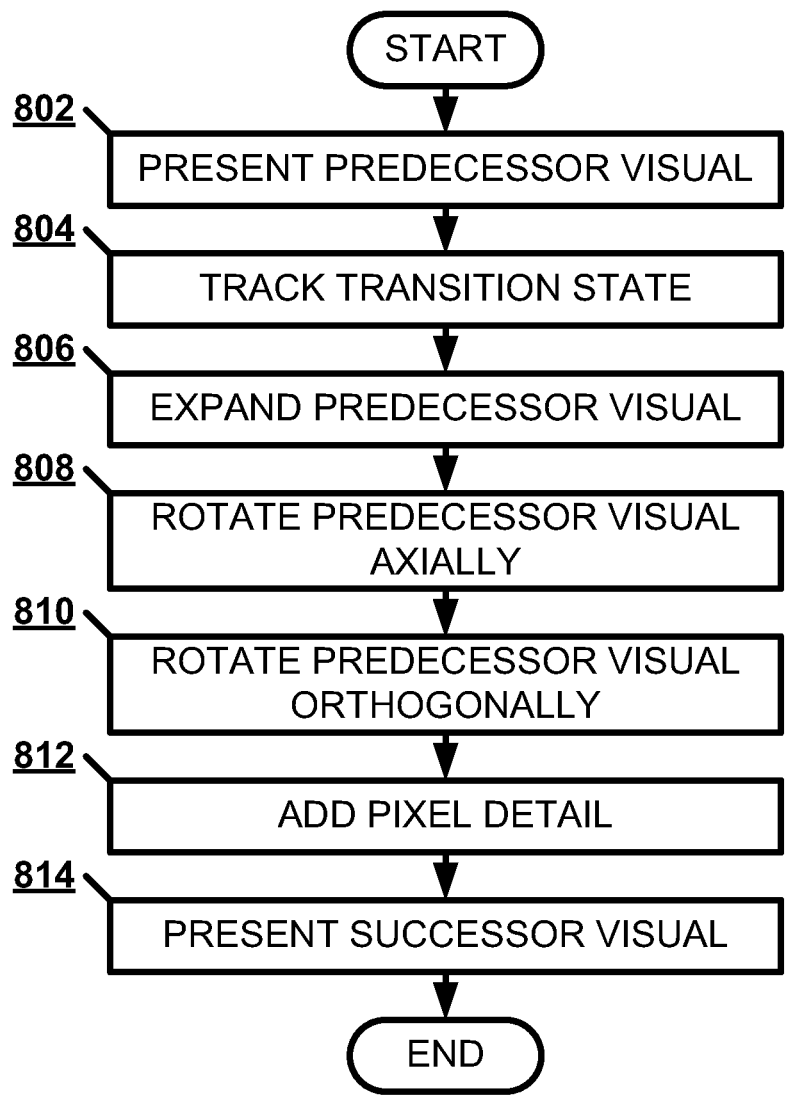
FIG. 8 illustrates, in a flowchart, one embodiment of a method for animating a transition.

FIG. 8 illustrates, in a flowchart, one embodiment of a method 800 for animating a transition. The application presentation system may present a predecessor visual 402 representing a predecessor operational state of an application (Block 802). The application presentation system may animate the transition in multiple ways. For example, the application presentation system may track the transition state of the application (Block 804). The application presentation system may expand the predecessor visual 402 to create a successor visual 404 (Block 806). The application presentation system may rotate the predecessor visual 402 axially to create the successor visual 404 (Block 808). The application presentation system may rotate the predecessor visual 402 orthogonally to create the successor visual 404 (Block 810). The application presentation system may add pixel detail to the predecessor visual 402 to create the successor visual 404 (Block 812). The application presentation system may present the successor visual 404 representing a successor operational state of the application (Block 814).

Although the subject matter has been described in language specific to structural features and/or methodological acts, it is to be understood that the subject matter in the appended claims is not necessarily limited to the specific features or acts described above. Rather, the specific features and acts described above are disclosed as example forms for implementing the claims.

Embodiments within the scope of the present invention may also include non-transitory computer-readable storage media for carrying or having computer-executable instructions or data structures stored thereon. Such non-transitory computer-readable storage media may be any available media that can be accessed by a general purpose or special purpose computer. By way of example, and not limitation, such non-transitory computer-readable storage media can comprise RAM, ROM, EEPROM, CD-ROM or other optical disk storage, magnetic disk storage or other magnetic storage devices, or any other medium which can be used to carry or store desired program code means in the form of computer-executable instructions or data structures. Combinations of the above should also be included within the scope of the non-transitory computer-readable storage media.

Embodiments may also be practiced in distributed computing environments where tasks are performed by local and remote processing devices that are linked (either by hardwired links, wireless links, or by a combination thereof) through a communications network.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Although the above description may contain specific details, they should not be construed as limiting the claims in any way. Other configurations of the described embodiments are part of the scope of the disclosure. For example, the principles of the disclosure may be applied to each individual user where each user may individually deploy such a system. This enables each user to utilize the benefits of the disclosure even if any one of a large number of possible applications do not use the functionality described herein. Multiple instances of electronic devices each may process the content in various possible ways. Implementations are not necessarily in one system used by all end users. Accordingly, the appended claims and their legal equivalents should only define the invention, rather than any specific examples given.

The invention claimed is:

1. A machine-implemented method, comprising:
presenting, with a computing device, a marker visual representing a placeholder state of an application;
changing the application, with the computing device, from the placeholder state to an interactive state represented by an application visual;
tracking, with the computing device, an application aspect of the application;
presenting, with the computing device, a transition animation tracking a transition between the placeholder state and the interactive state of the application, the transition animation including an application visual aspect representing the application aspect as the application aspect becomes active; and
presenting, with the computing device, the application visual representing the interactive state of the application.

2. The method of claim 1, further comprising receiving, with the computing device, a user input selecting the application, and wherein changing the application from the placeholder state to the interactive state is performed following receiving the user input selecting the application.

3. The method of claim 1, wherein presenting the marker visual includes presenting the visual marker as at least one of an icon and a tile.

4. The method of claim 1, further comprising, with the computing device, expanding the marker visual to create the application visual.

5. The method of claim 4, wherein the transition animation is an expanding transition animation that expands in two coordinate directions within a plane of a display of the computing device.

6. The method of claim 1, wherein the application visual is a full screen application visual that covers an active area of a display of the computing device upon conclusion of the transition animation.

7. The method of claim 1, wherein the marker visual is one of a plurality of marker visuals presented on a home screen of the computing device prior to changing the application from the placeholder state to the interactive state.

8. The method of claim 1, further comprising rotating the marker visual axially and/or orthogonally to create the application visual.

9. The method of claim 1, further comprising operating the application by running background operations for the application while displaying the marker visual.

10. A tangible machine-readable medium comprising a set of instructions stored thereon that when executed by one or more processors cause the one or more processors to:
present a marker visual representing a placeholder state of an application;
change the application from the placeholder state to an interactive state represented by an application visual;
track an application aspect of the application;
present a transition animation tracking a transition between the placeholder state and the interactive state of the application, the transition animation including an application visual aspect representing the application aspect as the application aspect becomes active; and
present the application visual representing the interactive state of the application.

11. The tangible machine-readable medium of claim 10, wherein execution of the set of instructions further causes the one or more processors to receive a user input that selects the application, and to change the application from the placeholder state to the interactive state following the user input.

12. The tangible machine-readable medium of claim 10, wherein execution of the set of instructions further causes the one or more processors to present the marker visual an icon or a tile.

13. The tangible machine-readable medium of claim 10, wherein execution of the set of instructions further causes the one or more processors to display the marker visual as expanding to create the application visual.

14. The tangible machine-readable medium of claim 10, wherein execution of the set of instructions further causes the one or more processors to display the transition animation as expanding from the marker visual to the application visual in two coordinate directions within a plane of a display.

15. The tangible machine-readable medium of claim 10, wherein execution of the instructions further causes the one or more processors to present the application visual as a full screen application visual that covers an active area of a display upon conclusion of the transition animation.

16. The tangible machine-readable medium of claim 15, wherein execution of the set of instructions further causes the one or more processors to present the marker visual as one of a plurality of marker visuals within a home screen of the computing device.

17. An application presentation system, comprising:
a display to present a graphical user interface;
an input device to receive a user input; and
one or more processors configured to:
- present, via the display, a marker visual representing a placeholder state of an application,
- change the application from the placeholder state to an interactive state represented by an application visual,
- track an application aspect of the application,
- present, via the display, a transition animation tracking a transition between the placeholder state and the interactive state of the application, the transition animation including an application visual aspect representing the application aspect as the application aspect becomes active, and
- present, via the display, the application visual representing the interactive state of the application.

18. The application presentation system of claim 17, wherein the one or more processors are further configured to receive, via the input device, a user input that selects the application, and to change the application from the placeholder state to the interactive state following the user input.

19. The application presentation system of claim 17, wherein the one or more processors are further configured to present the marker visual as one of a plurality of marker visuals presented on a home screen prior to the application being changed from the placeholder state to the interactive state.

20. The application presentation system of claim 17, wherein the one or more processors are further configured to present the transition animation as expanding in two coordinate directions within a plane of the display, and to present the application visual as a full screen application visual that covers an active area of the display upon conclusion of the transition animation.

* * * * *